(12) United States Patent
Fages

(10) Patent No.: US 12,703,500 B2
(45) Date of Patent: Aug. 11, 2026

(54) MODULAR POWER PLANT FOR A ROTORCRAFT AND ASSOCIATED ROTORCRAFT

(71) Applicant: AIRBUS HELICOPTERS, Marignane Cedex (FR)

(72) Inventor: Douchane Fages, Saint-Cannat (FR)

(73) Assignee: AIRBUS HELICOPTERS, Marignane (FR)

( * ) Notice: Subject to any disclaimer, the term of this patent is extended or adjusted under 35 U.S.C. 154(b) by 4 days.

(21) Appl. No.: 17/825,285

(22) Filed: May 26, 2022

(65) Prior Publication Data

US 2022/0380031 A1 Dec. 1, 2022

(30) Foreign Application Priority Data

May 28, 2021 (FR) ...................................... 2105605

(51) Int. Cl.
*B64D 35/08* (2025.01)
*B64C 27/12* (2006.01)
(Continued)

(52) U.S. Cl.
CPC ............ *B64D 35/022* (2024.01); *B64C 27/12* (2013.01); *B64D 27/33* (2024.01); *B64D 35/023* (2024.01); *B64D 27/026* (2024.01); *B64D 35/025* (2024.01)

(58) Field of Classification Search
CPC ... B64C 27/12; B64C 27/14; B64D 2027/026; B64D 35/00; B64D 35/02; B64D 35/08
See application file for complete search history.

(56) References Cited

U.S. PATENT DOCUMENTS 3,782,223 A 1/1974 Watson
4,554,989 A * 11/1985 Gruich .................... B60K 6/00 180/65.265

(Continued)

FOREIGN PATENT DOCUMENTS

CN 101495374 A 7/2009
DE 19707124 A1 9/1998

(Continued)

OTHER PUBLICATIONS

French Search Report for French Application No. FR2105605, Completed by the French Patent Office, Dated Jan. 26, 2022, 10 pages.

(Continued)

*Primary Examiner* — Peter D Nolan
(74) *Attorney, Agent, or Firm* — Brooks Kushman P.C.

(57) ABSTRACT

A modular power plant for a rotorcraft comprising at least one lift rotor, the power plant comprising: at least one combustion or electric engine; a main gearbox, comprising a gearbox housing and a toothed wheel arranged in an internal space at least partially delimited by the gearbox housing, the toothed wheel having a degree of rotational freedom about a primary axis of rotation relative to the gearbox housing, the toothed wheel mechanically transmitting an engine torque generated by the at least one engine to the at least one lift rotor; and at least two mechanical connection interfaces, a first mechanical connection interface mechanically connecting the main gearbox to a first engine, and a second mechanical connection interface being left free or mechanically connecting the main gearbox to a second engine.

19 Claims, 4 Drawing Sheets

(51) Int. Cl.

| | |
|---|---|
| ***B64D 27/02*** | (2006.01) |
| ***B64D 27/33*** | (2024.01) |
| ***B64D 35/022*** | (2024.01) |
| ***B64D 35/023*** | (2025.01) |
| ***B64D 35/025*** | (2025.01) |

(56) References Cited

U.S. PATENT DOCUMENTS

| | | | | |
|---|---|---|---|---|
| 4,811,627 | A | 3/1989 | Mouille | |
| 5,135,442 | A | 8/1992 | Bossler, Jr. | |
| 5,528,960 | A | 6/1996 | Nagao et al. | |
| 10,385,959 | B2 * | 8/2019 | Speller, Jr. | B64C 27/14 |
| 2006/0269414 | A1 | 11/2006 | Palcic et al. | |
| 2010/0013223 | A1 | 1/2010 | Certain | |
| 2012/0025032 | A1 | 2/2012 | Hopdjanian et al. | |
| 2012/0329593 | A1 * | 12/2012 | Larrabee | B64U 50/13 903/910 |
| 2014/0145028 | A1 | 5/2014 | Gomez | |
| 2015/0360774 | A1 | 12/2015 | Covington et al. | |
| 2018/0017153 | A1 * | 1/2018 | Speller, Jr. | F16H 57/082 |
| 2020/0109776 | A1 | 4/2020 | Mueller | |
| 2020/0172224 | A1 | 6/2020 | Gazzino | |
| 2020/0407052 | A1 | 12/2020 | Preisser | |
| 2022/0048615 | A1 * | 2/2022 | Even | B64D 27/33 |

FOREIGN PATENT DOCUMENTS

| | | | |
|---|---|---|---|
| EP | 2735512 | A1 | 5/2014 |
| FR | 2962404 | A1 | 1/2012 |
| FR | 3089205 | A1 | 6/2020 |
| WO | 8806689 | A | 9/1988 |

OTHER PUBLICATIONS

First Office Action for Chinese Application No. 202210594566.6, dated Nov. 23, 2024, 7 Pages.

* cited by examiner

MODULAR POWER PLANT FOR A ROTORCRAFT AND ASSOCIATED ROTORCRAFT

CROSS REFERENCE TO RELATED APPLICATIONS

This application claims priority to French patent application No. FR 2105605 filed on May 28, 2021, the disclosure of which is incorporated in its entirety by reference herein.

TECHNICAL FIELD

The present disclosure relates to the field of modular power plants intended to equip a rotorcraft.

BACKGROUND

Such power plants may further comprise one or more combustion engines and/or one or more electric engines.

Generally, such power plants are referred to as modular power plants because each of their engines may subsequently be modified, adapted or replaced, completely or partially, with another engine of a different type and/or different power depending on the needs of the user or indeed a particular mission.

Document FR 3 089 205 describes such a rotorcraft comprising a modular power plant. This rotorcraft has at least one combustion or electric engine and a main gearbox for mechanically transmitting an engine torque generated by the engine or engines to at least one lift rotor.

Furthermore, the rotorcraft also comprises at least two mechanical connection interfaces mechanically connected to the main gearbox, a first mechanical connection interface mechanically connecting the main gearbox to the first engine and a second mechanical connection interface being left free or mechanically connecting the main gearbox to a second engine.

Document FR 2 962 404 describes a hybrid aircraft comprising a first combustion engine and a second electric engine. Furthermore, such a hybrid aircraft also comprises a single main gearbox connected to the first engine and the second engine.

Each engine comprises its own input into the main gearbox. Such a power plant therefore is not modular, and cannot be adapted to one or more engines.

Moreover, document EP 2 735 512 describes a hybrid aircraft comprising a main gearbox, a first combustion engine and a second electric engine. However, in this case, the second engine drives a transmission shaft arranged between the first engine and the main gearbox.

A rotorcraft having a power plant comprising an electric machine operating in alternator mode and connected to an output of the main gearbox is also known. For certain flight phases, such an electric machine may also operate in motor mode, the output shaft of the main gearbox then becoming an input shaft for transmitting mechanical power to at least one rotor. This solution therefore helps limit the number of inputs allowing different engines to be connected, but may necessitate the use of a mechanical interconnection means arranged between the electric machine and heat engine or engines. Such a mechanical interconnection means may be difficult to obtain because of the very different rotational speeds of the electric machine and the heat engine or engines.

As disclosed by document US 2015/360774 A1, an aircraft with tilt rotors comprising a rotor mast 101 that is able to rotate about a conversion axis is also known.

Furthermore, drive units 207$a$-207$c$ are controlled selectively in order to pivot the rotor mast 101 between an airplane mode, in which the rotor mast 101 is essentially horizontal, and a helicopter mode in which the rotor mast 101 is essentially vertical.

An external differential system 203 and an internal differential system 205 function to rotate the rotor mast 101 about the conversion axis.

These differential systems 203, 205 are redundant because, if one of the external 203 or internal 205 differential systems fails and becomes jammed, the differential system that is still in working order can continue to function to rotate the rotor mast 101 through the entire range of movement, but at a reduced speed. In an embodiment in which the external differential system 203 and the internal differential system 205 are configured to function at the same speed, the reduced speed is equal to half the normal operational speed.

Furthermore, the external differential system 203 comprises a pinion 703 and the internal differential system 205 comprises a pinion 713. The axis of rotation of these pinions 703, 713 is arranged parallel to the conversion axis, which is different from the axis of rotation of a rotor mast.

However, no main gearbox is described in such a way as to mechanically transmit an engine torque generated by an engine to a rotor mast constrained to rotate with a lift rotor.

Document US 2010/013223A1 describes a power plant of a rotorcraft having two turboshaft engines 253, 254.

This power plant 200 has first and second external coupling devices 210, 220 respectively for the first and second turboshaft engines 253, 254.

These first and second external coupling devices 210, 220 are arranged upstream of a main gearbox.

Moreover, these first and second external coupling devices 210, 220 comprise pinions 222 and 232 cooperating with a toothed wheel 204 connected to an input shaft of the main gearbox.

However, document US 2010/013223A1 does not describe a modular aspect of such a power plant. Indeed, there is no indication that the first and second external coupling devices 210, 220 each comprise an interface housing and reversible securing means for securing each interface housing with a gearbox housing of the main gearbox and releasing it therefrom.

As described in document DE 197 07 124A1, a gear transmission gearbox is also known. Two pinions 10 of the power transmission train are fixed in such a way as to be able to move in translation relative to their shafts, in order to compensate for the backlash between the teeth of the gears, when a power flow is reversed.

This document also describes the use of bevel pinions 2 forming angle gears with pinions 4 driving an output stage 3 provided with a toothed wheel.

However, document DE 197 07 124A1 does not describe a modular aspect of a power plant of a rotorcraft with connection interfaces that can be released from a housing of the main gearbox.

Document WO 88/06689 A describes multi-engine power plant equipping an airplane.

Each engine 24, 26 transmits an engine torque to a gearbox by means of an input shaft 34, 35 and a connection interface.

Furthermore, a first connection interface has a first input pinion 112 cooperating with a first idler pinion 116, itself meshing with a first toothed wheel 120 secured to an output shaft 22.

A second connection interface has a second input pinion 112 cooperating with a second idler pinion 116, itself meshing with a second toothed wheel 122 secured to the output shaft 22.

However, the first and the second toothed wheels 120 and 122 are separate from each other and are arranged in different portions of a gearbox housing. Such an architecture therefore does not have a single toothed wheel cooperating with pinions of two connection interfaces.

SUMMARY

An object of the present disclosure is therefore to propose a modular power plant offering optimal compactness with mechanical connection interfaces comprising a limited number of parts.

The disclosure therefore relates to a modular power plant for a rotorcraft comprising at least one lift rotor, this power plant comprising:

- at least one engine chosen in the group comprising the combustion type engines and the electric type engines;
- a main gearbox, comprising a gearbox housing and a toothed wheel arranged in an internal space at least partially delimited by the gearbox housing, the toothed wheel having a degree of rotational freedom about a primary axis of rotation relative to the gearbox housing, the primary axis of rotation coinciding with or being parallel to a rotor axis of rotation of said at least one lift rotor, the toothed wheel mechanically transmitting an engine torque generated by the at least one engine to a rotor mast constrained to rotate with said at least one lift rotor; and
- at least two mechanical connection interfaces, a first mechanical connection interface mechanically connecting the main gearbox to a first engine of said at least one engine and a second mechanical connection interface being left free or mechanically connecting the main gearbox to a second engine of said at least one engine.

According to the disclosure, such a power plant is remarkable in that each mechanical connection interface comprises a pinion directly meshing with the toothed wheel, the pinions being distributed in azimuth around the primary axis of rotation, each pinion having a degree of rotational freedom about a secondary axis of rotation relative to the gearbox housing, each secondary axis of rotation being arranged parallel to the primary axis of rotation, and in that each mechanical connection interface comprises an interface housing and reversible securing means for securing the interface housing with the gearbox housing and alternatively for releasing the interface housing from the gearbox housing.

Furthermore, the toothed wheel may comprise a plurality of straight teeth or, according to another alternative, helical or indeed herringbone teeth, and the pinions comprise matching teeth. The toothed wheel and the pinions are thus interconnected and arranged in the internal space delimited by the gearbox housing.

According to a first embodiment of the disclosure, the primary axis of rotation may coincide with a rotor axis of rotation of said at least one lift rotor. In this case, the toothed wheel may be a large wheel driving, for example via at least one epicyclic speed reduction stage or the like, a rotor mast constrained to rotate with said at least one lift rotor.

According to a second embodiment of the disclosure, the primary axis of rotation may be different from the rotor axis of rotation of said at least one lift rotor. However, the primary axis of rotation may be arranged parallel with the rotor axis of rotation of said at least one lift rotor. In this case, the toothed wheel may be a separate wheel cooperating with a large wheel directly or indirectly driving said at least one lift rotor.

Each mechanical connection interface may also comprise an input shaft constrained to rotate with a pinion. Each input shaft then allows an engine torque to be transmitted between each engine and each pinion. Each input shaft is arranged coaxially with a secondary axis of rotation.

Furthermore, the toothed wheel may be supported and guided in rotation directly by the gearbox housing. Such an arrangement helps limit the space requirement of the power plant and limit the number of parts constituting each mechanical connection interface.

Moreover, each pinion may be supported and guided in rotation directly by the gearbox housing.

Furthermore, the mechanical connection interfaces may then be detached and removed from the gearbox housing, for example in order to carry out a maintenance operation, and may optionally be replaced, with the gearbox housing being left arranged on the rotorcraft.

Advantageously, at least one of said at least two mechanical connection interfaces may comprise at least one rotation speed reduction stage.

In other words, the first mechanical connection interface may allow the speed of rotation of the first engine to be reduced and/or the second mechanical connection interface may allow the speed of rotation of the second engine to be reduced.

In practice, each rotation speed reduction stage may be formed directly by each pinion and the toothed wheel. Indeed, the toothed wheel may comprise a greater number of teeth than each pinion, which has the effect of reducing the speed of rotation of the toothed wheel relative to the speed of rotation of each input shaft.

According to an embodiment of the disclosure compatible with the preceding embodiments, at least one of said at least two mechanical connection interfaces may comprise at least one angle gear.

Such an angle gear may comprise a pair of pinions cooperating with each other. These pinions then have a beveled shape and have, for example, straight, helical or indeed, possibly, hypoid toothings.

Such an angle gear may equip the first mechanical connection interface and/or the second mechanical connection interface. This angle gear allows an input shaft to be arranged perpendicularly with respect to a secondary axis of rotation.

In practice, one of said at least two mechanical connection interfaces may comprise an output shaft constrained to rotate with the pinion, the output shaft mechanically transmitting an engine torque generated by said at least one engine to an auxiliary member of the rotorcraft.

In other words, the pinion is rotated by an input shaft arranged at a first face of the pinion, and the pinion then allows the output shaft arranged at a second face of the pinion opposite the first face to be rotated.

This mechanical connection interface thus allows an engine torque to be transmitted, for example, to an auxiliary member such as a rear rotor of the rotorcraft in order to control the torque transmitted by the rotation of a lift rotor to the structure of the rotorcraft and/or to control the yawing motion of the rotorcraft. Furthermore, the auxiliary member may also be formed by one or more pusher or tractor propellers and by an electric machine operating in generator mode in order to generate an electric current for recharging a battery, in particular.

According to a first variant of the disclosure, the first mechanical connection interface may comprise the output shaft.

Therefore, in this case, the first engine allows an engine torque to be transmitted directly to the auxiliary member.

According to a second variant of the disclosure, the second mechanical connection interface may comprise the output shaft.

In this case, if the second mechanical connection interface is left free, only the first engine allows an engine torque to be transmitted to the auxiliary member.

However, if the second mechanical connection interface mechanically connects the main gearbox to a second engine, the first engine and/or the second engine allow an engine torque to be transmitted to the auxiliary member.

Advantageously, said at least two mechanical connection interfaces may comprise a third mechanical connection interface that is left free or mechanically connects the main gearbox to a third engine of said at least one engine.

Such an arrangement therefore makes it possible to equip a single main gearbox with one, two or three engines, each of which can be a combustion or electric engine.

Furthermore, in order to balance the rotorcraft, when the power plant comprises a single engine cooperating with a first mechanical connection interface, this first mechanical connection interface is then arranged in a median plane of the rotorcraft. The second and third mechanical connection interfaces, which are left free, are arranged symmetrically to either side of the median plane of the rotorcraft.

Similarly, when the power plant comprises two engines, namely a first engine and a second engine, the first and second mechanical connection interfaces are arranged symmetrically to either side of the median plane of the rotorcraft. The third mechanical connection interface, which is left free, is arranged in the median plane of the rotorcraft.

Finally, when the power plant comprises three engines, according to a first example, the first and second mechanical connection interfaces may be arranged symmetrically to either side of the median plane of the rotorcraft. The third mechanical connection interface is arranged in the median plane of the rotorcraft.

According to a second example, the first mechanical connection interface may be arranged in the median plane of the rotorcraft. The second and the third mechanical connection interfaces are then arranged symmetrically to either side of the median plane of the rotorcraft.

In practice, the secondary axes of rotation may be distributed in azimuth around the primary axis of rotation at an angle of between 20 degrees and 60 degrees.

Such a distribution angle makes it possible to adapt to all the possible combustion or electric engine configurations and offers an optimal trade-off between the space requirement of the power plant and the size and/or power of the at least one engine.

Another object of the present disclosure is a rotorcraft comprising at least one lift rotor rotated by at least one engine chosen in the group comprising the combustion type engines and the electric type engines.

According to the disclosure, such a rotorcraft is remarkable in that it comprises a modular power plant as mentioned above.

In other words, such a rotorcraft comprises at least two mechanical connection interfaces and may comprise one or more engines.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
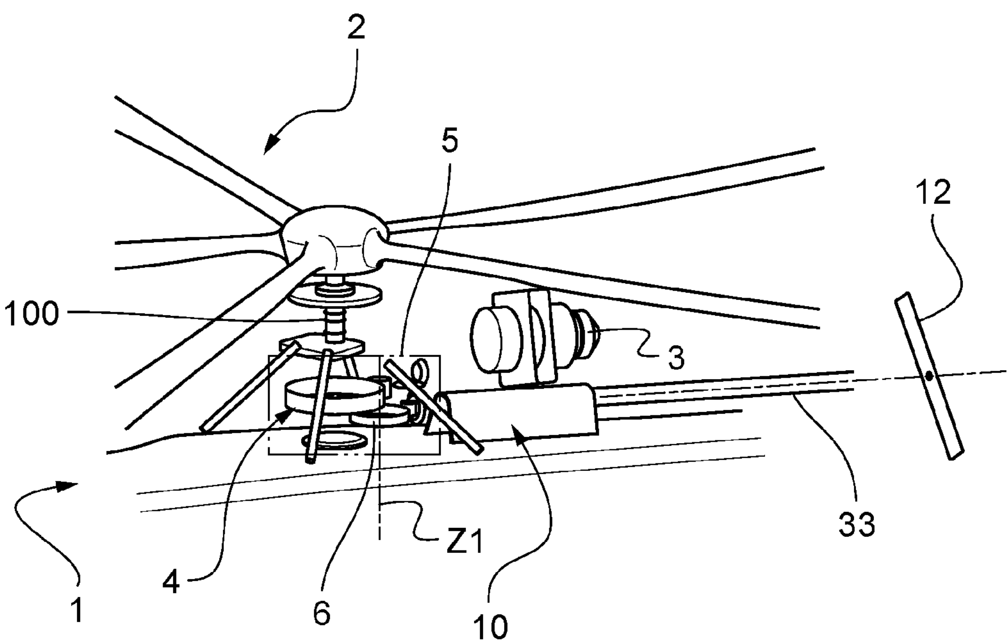
FIG. 1 is a first partial three-dimensional view of a rotorcraft according to the disclosure.
Figure 2:
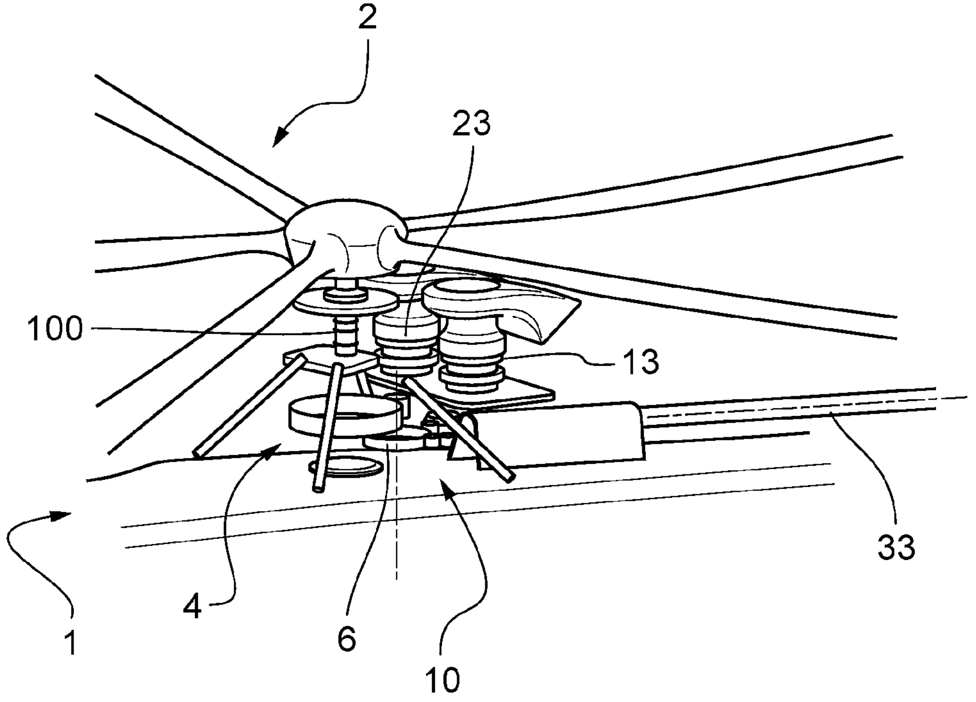
FIG. 2 is a second partial three-dimensional view of the rotorcraft according to the disclosure.
Figure 3:
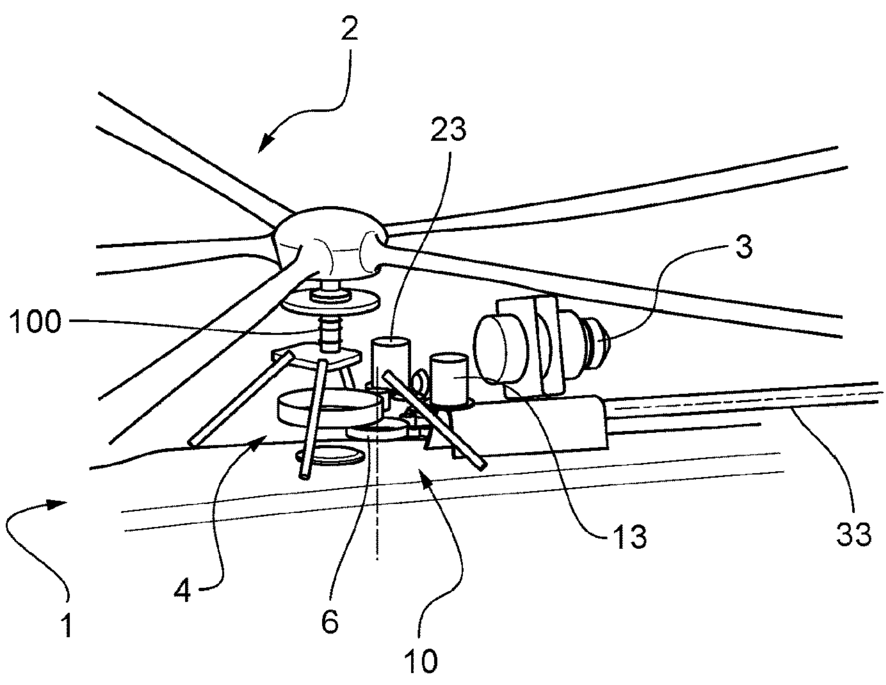
FIG. 3 is a third partial three-dimensional view of the rotorcraft according to the disclosure.

As shown in FIGS. 1 to 3, the disclosure relates to a rotorcraft 1 provided with at least one lift rotor 2 comprising a plurality of blades. In order to rotate this or these rotors 2, such a rotorcraft 1 also comprises a power plant 10 having at least one combustion or electric engine 3, 13, 23.

According to FIG. 1, which partially represents such a power plant 10, a first engine 3 may be a combustion engine such as a piston engine or indeed a turboshaft engine.

According to FIG. 2, the power plant 10 may have at least one electric engine, for example a first engine 13 being an electric engine and a second engine 23 also being an electric engine.

According to FIG. 3, the power plant 10 may have at least a first electric engine 13, and indeed a second engine 23 that is also an electric engine, and a third combustion engine 3.

Furthermore, irrespective of the number of engines, the power plant 10 comprises a main gearbox 4, comprising a gearbox housing 5 and a toothed wheel 6 arranged in an internal space at least partially delimited by the gearbox housing 5.

Such a toothed wheel 6 has a degree of rotational freedom about a primary axis of rotation Z1 relative to the gearbox housing 5. This toothed wheel 6 allows an engine torque generated by the engine or engines 3, 13, 23 to be transmitted mechanically to said at least one lift rotor 2 via a mechanical link. Such a mechanical link may comprise a rotor mast 100, at least one speed reduction stage, for example an epicyclic speed reduction stage, etc.

Such a power plant 10 is said to be modular because it comprises at least two mechanical connection interfaces 7, 17, 27, a first mechanical connection interface 7, 17, 27 mechanically connecting the main gearbox 4 to a first engine 3, 13, 23 and a second mechanical connection interface 7, 17, 27 being left free or mechanically connecting the main gearbox 4 to a second engine 3, 13, 23.

In order to keep the space requirement of this power plant 10 small, each mechanical connection interface 7, 17, 27 comprises a pinion 8, 18, 28 meshing directly with the toothed wheel 6. These pinions 8, 18, 28 are distributed in azimuth around the primary axis of rotation Z1, possibly but not necessarily at equal distances.

Furthermore, the respective pinions 8, 18, 28 of each mechanical connection interface 7, 17, 27 have a degree of rotational freedom around respective secondary axes of rotation Z2, Z2', Z2" relative to the gearbox housing 5. Such secondary axes of rotation Z2, Z2', Z2" are thus arranged respectively parallel to the primary axis of rotation Z1.

Moreover, such secondary axes of rotation Z2, Z2', Z2" are distributed in azimuth around the primary axis of rotation Z1 at an angle of between 20 degrees and 60 degrees.

Figure 4:
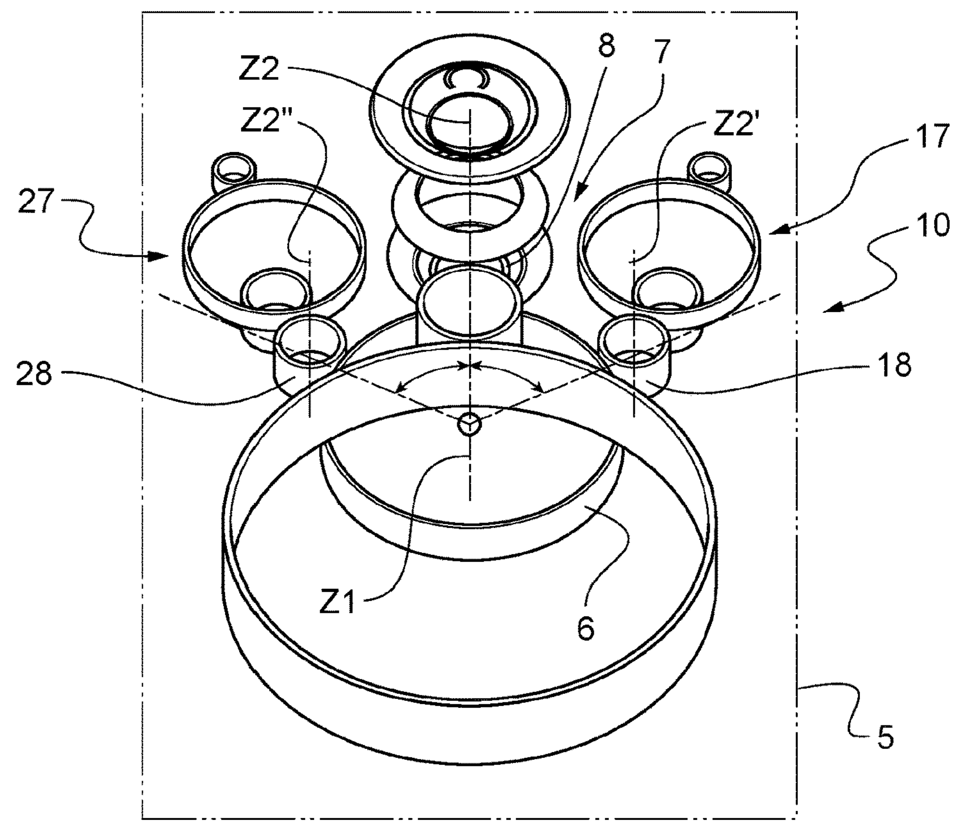
FIG. 4 is a first partial schematic representation of a power plant according to the disclosure.

As shown in FIG. 4, the respective pinions 8, 18, 28 of each mechanical connection interface 7, 17, 27 may be carried by input shafts guided directly in rotation by the gearbox housing 5.

Figure 5:
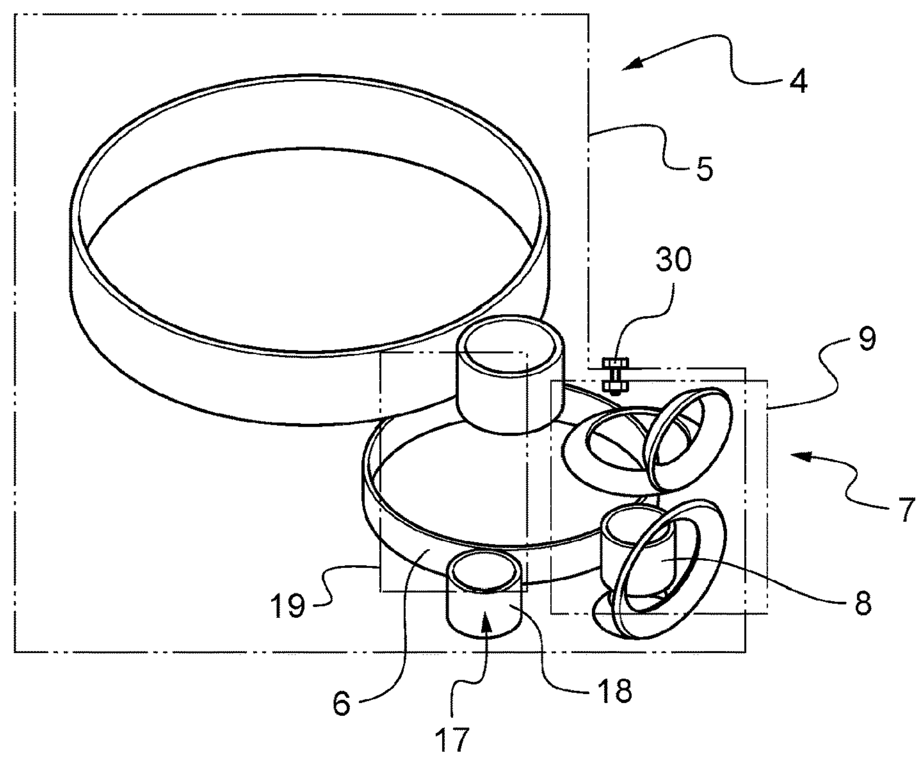
FIG. 5 is a second partial schematic representation of a power plant according to the disclosure.
Figure 6:
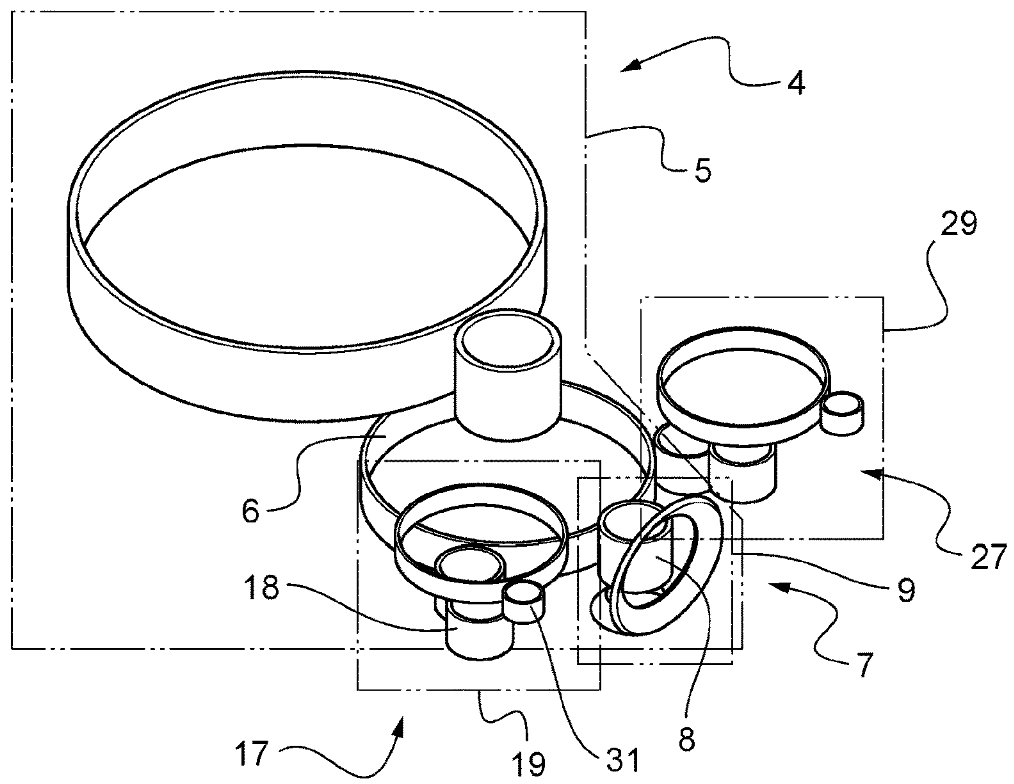
FIG. 6 is a third partial schematic representation of a power plant according to the disclosure.
Figure 7:
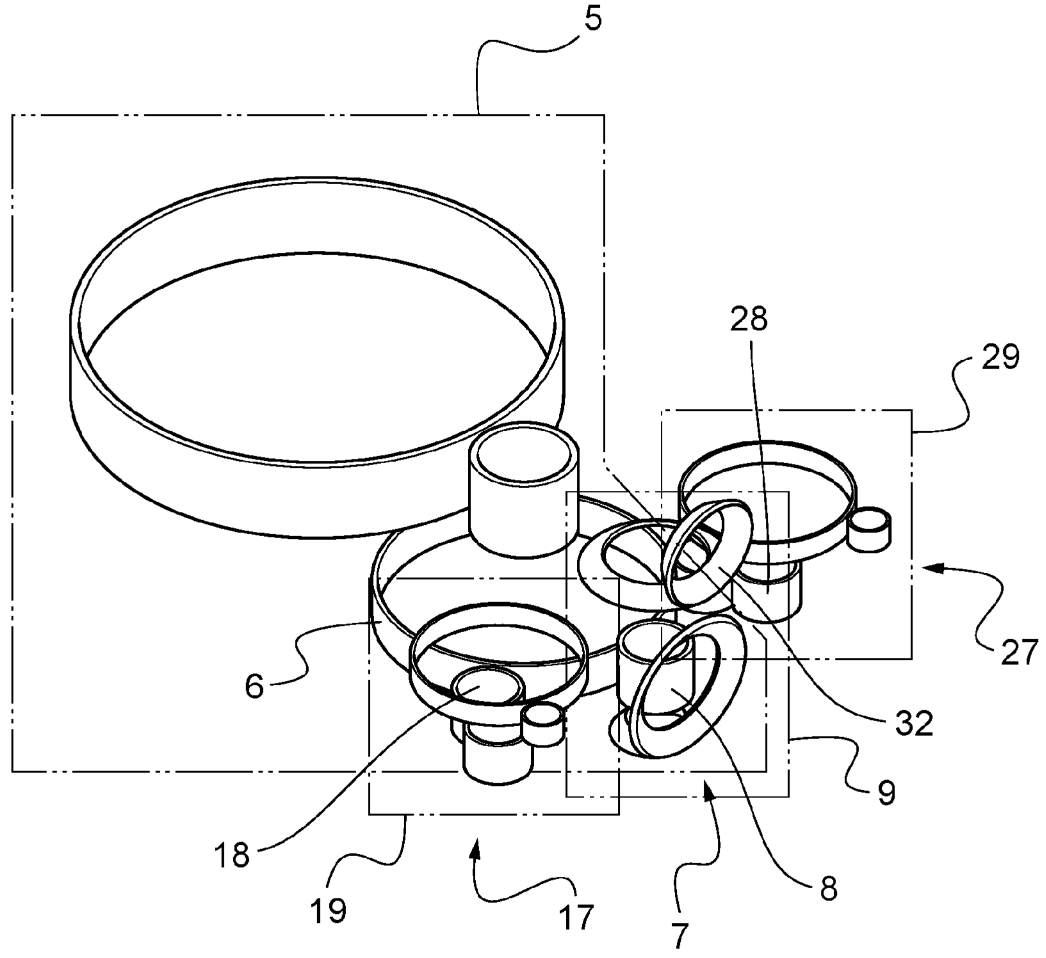
FIG. 7 is a fourth partial schematic representation of a power plant according to the disclosure.

However, according to other examples shown in FIGS. 5 to 7, the different mechanical connection interfaces 7, 17, 27 may also respectively comprise an interface housing 9, 19, 29 and reversible securing means 30 for securing this interface housing 9, 19, 29 with the gearbox housing 5 and alternatively releasing or removing it therefrom.

Advantageously, each of the mechanical connection interfaces 7, 17, 27 may in this case be removed from the main gearbox 4 and optionally replaced, for example, by another mechanical connection interface corresponding to another engine.

These reversible securing means 30 may, for example, have screws cooperating with matching nuts or tappings or even studs cooperating with nuts in order to reversibly secure each interface housing 9, 19, 29 with the gearbox housing 5 by tightening screws and/or nuts.

Furthermore, as shown in FIG. 6, the mechanical connection interfaces 7, 17, 27 may comprise at least one rotation speed reduction stage 31. This rotation speed reduction stage 31 may be limited to the pairing formed by the toothed wheel 6 with the pinions 8, 18, 28 or may indeed have one or more other gears.

This rotation speed reduction stage 31 makes it possible to reduce the speed of rotation of the input shaft and to rotate the toothed wheel 6 at a speed of rotation slower than the speed of rotation of the engine 3, 13, 23.

Similarly, as shown in FIG. 7, a mechanical connection interface 7, 17, 27 may comprise at least one angle gear 32.

Such an angle gear 32 may comprise, for example, two bevel pinions with helical teeth, and then allows an input shaft corresponding to an engine 3, 13, 23 to be arranged perpendicular to the secondary axis of rotation Z2, Z2', Z2" of the pinion 8, 18, 28 with which the angle gear 32 cooperates.

Advantageously, one of the mechanical connection interfaces 7, 17, 27 may comprise an output shaft 33 constrained to rotate with a pinion 8, 18, 28. Such an output shaft 33 mechanically transmits an engine torque generated by an engine 3, 13, 23 to an auxiliary member 12 such as a rear rotor of the rotorcraft 1. Such a rear rotor is generally arranged at a tail boom and makes it possible, in particular, to control the yawing motion of the rotorcraft 1.

The first mechanical connection interface 7, 17, 27 may comprise the output shaft 33.

In this case, the first mechanical connection interface 7, 17, 27 is connected both to the first engine 3, 13, 23 by an input shaft, to the toothed wheel 6 by the pinion 8, 18, 28 and to the auxiliary member 12 by the output shaft 33.

Alternatively, the second mechanical connection interface 7, 17, 27 may comprise the output shaft 33.

In this case, the second mechanical connection interface 7, 17, 27 may be connected both to the second engine 3, 13, 23 by an input shaft, to the toothed wheel 6 by the pinion 8, 18, 28 and to the auxiliary member 12 by the output shaft 33. However, if the second mechanical connection interface 7, 17, 27 is left free, the pinion 8, 18, 28 of this second mechanical connection interface 7, 17, 27 is then rotated by the toothed wheel 6.

The pinion 8, 18, 28 may then transmit an engine torque to the output shaft 33, and consequently to the auxiliary member 12.

In practice, and as shown in FIGS. 4 and 7, the at least two mechanical connection interfaces 7, 17, 27 may comprise a third mechanical connection interface 27 that may be left free or indeed mechanically connect the main gearbox 4 to a third engine 23.

Furthermore, the auxiliary member 12 may also be formed by one or more pusher or tractor propeller or indeed alternatively by an electric machine operating in generator mode.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A rotorcraft with a lift rotor driven with a modular power plant comprising:

at least one engine chosen in the group comprising a combustion type engines and an electric type engines;

a main gearbox comprising a gearbox housing and a toothed wheel arranged in an internal space at least partially delimited by the gearbox housing, the toothed wheel having a degree of rotational freedom about a primary axis of rotation relative to the gearbox housing, the primary axis of rotation coinciding with or being parallel to a rotor axis of rotation of the at least one lift rotor, the toothed wheel mechanically transmitting an engine torque generated by the at least one engine to a rotor mast constrained to rotate with the at least one lift rotor; and a first mechanical connection interface positioned in a first interface housing separate from and secured to the main gear box, the first mechanical connection interface mechanically connecting the main gearbox to a first engine of the at least one engine; and a second mechanical connection interface positioned in a second interface housing separate from and secured to the main gear box, the second mechanical connection interface configured to mechanically connect and disconnect the main gearbox to a second engine of the at least one engine, wherein each mechanical connection interface comprises a pinion directly meshing with the toothed wheel, the first and second pinions being distributed in azimuth around the primary axis of rotation, each of the first and second pinions having a degree of rotational freedom about a secondary axis of rotation relative to the gearbox housing, each secondary axis of rotation being arranged parallel to the primary axis of rotation, wherein the modular power plant is operable in a first and second configuration, wherein in the first configuration the modular power plant only connects the first engine and the second engine is disconnected in the first configuration, wherein in the second configuration the modular power plant connects the first engine and the second engine is connected in the second configuration.

2. The rotorcraft according to claim 1, wherein at least one of the first and second mechanical connection interfaces comprises at least one rotation speed reduction stage.

3. The rotorcraft according to claim 1, wherein at least one of the first and second mechanical connection interfaces comprises at least one angle gear.

4. The rotorcraft according to claim 1, wherein one of the at first and second connection interfaces comprises an output shaft constrained to rotate with the pinion, the output shaft mechanically transmitting an engine torque generated by the at least one engine to an auxiliary member of the rotorcraft.

5. The rotorcraft according to claim 4, wherein the first mechanical connection interface comprises the output shaft.

6. The rotorcraft according to claim 4, wherein the second mechanical connection interface comprises the output shaft.

7. The rotorcraft according to claim 1, further comprising a third mechanical connection interface that configured to mechanically connects the main gearbox to a third engine of the at least one engine in a third configuration of the modular power plant.

8. The rotorcraft according to claim 1, wherein the secondary axes of rotation are oriented in azimuth from the primary axis of rotation at an azimuth angle of in a range of +/−20-60 degrees.

9. A rotorcraft with a lift rotor driven with a modular power plant comprising:

two engines selected from the group comprising a combustion type engine and an electric type engine;

a main gearbox comprising a gearbox housing and a toothed wheel arranged in an internal space at least partially delimited by the gearbox housing, the toothed wheel having a degree of rotational freedom about a primary axis of rotation relative to the gearbox housing, the primary axis of rotation coinciding with or being parallel to a rotor axis of rotation of the at least one lift rotor, the toothed wheel mechanically transmitting an engine torque generated at least one of the engines to a rotor mast constrained to rotate with the at least one lift rotor; and at least two mechanical connection interfaces, a first mechanical connection interface mechanically connecting the main gearbox to a first engine of the two engines, and a second mechanical connection interface configured to mechanically connect and disconnect the main gearbox to a second engine of the two engines, wherein each mechanical connection interface comprises a pinion directly meshing with the toothed wheel, each of the pinions distributed around the primary axis of rotation, each pinion having a degree of rotational freedom about a secondary axis of rotation relative to the gearbox housing, each secondary axis of rotation arranged parallel to the primary axis of rotation, and wherein each mechanical connection interface comprises an interface housing reversible securing the interface housing with the gearbox housing and alternatively for releasing the interface housing from the gearbox housing, wherein the modular power plant is operable in a first and second configuration, wherein in the first configuration the modular power plant only connects the first engine and the second engine is disconnected in the first configuration, wherein in the second configuration the modular power plant connects the first engine and the second engine is connected in the second configuration.

10. The rotorcraft according to claim 9, wherein at least one of the at least two mechanical connection interfaces comprises at least one rotation speed reduction stage.

11. The rotorcraft according to claim 9, wherein at least one of the at least two mechanical connection interfaces comprises at least one angle gear.

12. The rotorcraft according to claim 9, wherein one of the at least two mechanical connection interfaces comprises an output shaft constrained to rotate with the pinion, the output shaft mechanically transmitting an engine torque generated by the at least one engine to an auxiliary member of the rotorcraft.

13. The rotorcraft according to claim 12, wherein the first mechanical connection interface comprises the output shaft.

14. The rotorcraft according to claim 12, wherein the second mechanical connection interface comprises the output shaft.

15. The rotorcraft according to claim 9, further comprising a third engine, and a third mechanical connection interface configured to mechanically connects the main gearbox to the third engine in a third configuration of the modular power plant.

16. A rotorcraft with a lift rotor driven with a modular power plant comprising:

a first engine and a second engine, the first and second engines selected from the group comprising a combustion engine and an electric engine;

a main gearbox comprising a gearbox housing and a toothed wheel arranged in an internal space of the gearbox housing, the toothed wheel having a degree of rotational freedom about a primary axis of rotation relative to the gearbox housing, the primary axis of rotation coinciding with or being parallel to a rotor axis of rotation of the lift rotor, the toothed wheel mechanically transmitting an engine torque generated by the engines to a rotor mast constrained to rotate with the lift rotor; and two mechanical connection interfaces, a first mechanical connection interface mechanically connecting the main gearbox to the first engine, and a second mechanical connection interface opeable to connect and disconnect the second engine to the main gearbox, wherein each mechanical connection interface comprises a pinion directly meshing with the toothed wheel, the pinions distributed in azimuth around the primary axis of rotation, each pinion having a degree of rotational freedom about a secondary axis of rotation relative to the gearbox housing, each secondary axis of rotation being arranged parallel to the primary axis of rotation, and wherein each mechanical connection interface comprises an interface housing reversible securing the interface housing with the gearbox housing and alternatively for releasing the interface housing from the gearbox housing, wherein the modular power plant is operable in a first and second configuration, wherein in the first configuration the modular power plant only connects the first engine and the second engine is disconnected in the first configuration, wherein in the second configuration the modular power plant connects the first engine and the second engine is connected in the second configuration.

17. The rotorcraft according to claim 16, wherein at least one of the two mechanical connection interfaces comprises at least one rotation speed reduction stage.

18. The rotorcraft according to claim 16, wherein at least one of the two mechanical connection interfaces comprises at least one angle gear.

19. A rotorcraft according to claim 16, further comprising a third engine, and a third mechanical connection interface configured to mechanically connects the main gearbox to the third engine in a third configuration of the modular power plant.

* * * * *